US009326252B2

United States Patent
Gandhi et al.

(10) Patent No.: US 9,326,252 B2
(45) Date of Patent: Apr. 26, 2016

(54) METHODS AND DEVICES FOR BOOSTING TRANSMISSION POWER OF A SIGNAL IN A WIRELESS COMMUNICATIONS SYSTEM

(71) Applicant: Alcatel-Lucent USA Inc., Murray Hill, NJ (US)

(72) Inventors: Asif Gandhi, Edison, NJ (US); Gregg Nardozza, Madison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 412 days.

(21) Appl. No.: 14/017,702

(22) Filed: Sep. 4, 2013

(65) Prior Publication Data
US 2015/0063220 A1    Mar. 5, 2015

(51) Int. Cl.
*H04B 7/185*    (2006.01)
*H04W 52/22*    (2009.01)

(52) U.S. Cl.
CPC .......... *H04W 52/228* (2013.01); *H04W 52/225* (2013.01)

(58) Field of Classification Search
CPC .................................. H04W 52/225–52/228
USPC ................................. 370/318, 321
See application file for complete search history.

(56) References Cited

U.S. PATENT DOCUMENTS

| | | | | |
|---|---|---|---|---|
| 6,961,581 B2* | 11/2005 | Goto | ............. | H04W 52/343 455/127.1 |
| 8,805,432 B2* | 8/2014 | Suzuki | ............. | H04W 52/225 370/328 |
| 2005/0186982 A1* | 8/2005 | Chen | ............. | H04W 52/22 455/522 |
| 2006/0268787 A1* | 11/2006 | Strutt | ............. | H04W 52/10 370/335 |
| 2007/0066336 A1* | 3/2007 | Merboth | ............. | H04W 52/286 455/522 |
| 2009/0186648 A1* | 7/2009 | Larsson | ............. | H04W 52/242 455/522 |

* cited by examiner

*Primary Examiner* — Ricky Ngo
*Assistant Examiner* — Dewanda Samuel
(74) *Attorney, Agent, or Firm* — Harness, Dickey & Pierce, P.L.C.

(57) ABSTRACT

A method for transmitting a signal in a wireless communications network includes calculating, by a network element, first and second average powers. The first average power is associated with a first time period of a downlink transmission between a transmitter associated with the network element and at least one user, and the second average power is associated with a second time period of the downlink transmission. The method includes transmitting, by the transmitter, the signal at one of a rated transmission power and a boosted transmission power based on a first threshold value associated with the first average power and a second threshold value associated with the second average power. The rated transmission power is less than or equal to a long-term average power limit associated with a power amplifier of the transmitter, and the boosted transmission is greater than the rated power.

18 Claims, 5 Drawing Sheets

FIG. 1B

Conventional Power Assignment to various Channels in Different OFDM Symbols for a 30W PA Setting - Average over the TTI is 24.28 Watts

| 30 W P A | Slot 0-OFDM Symbol # | | | | | | | Slot 1-OFDM Symbol # | | | | | | |
|---|---|---|---|---|---|---|---|---|---|---|---|---|---|---|
| Different LTE Channels | 0 | 1 | 2 | 3 | 4 | 5 | 6 | 0 | 1 | 2 | 3 | 4 | 5 | 6 |
| reference Signal Power | 3981 | 0 | 0 | 0 | 3981 | 0 | 0 | 3981 | 0 | 0 | 0 | 3981 | 0 | 0 |
| primary Sync Signal Power Offset | 0 | 0 | 0 | 0 | 0 | 0 | 4925 | 0 | 0 | 0 | 0 | 0 | 0 | 0 |
| secondary Sync Signal Power Offset | 0 | 0 | 0 | 0 | 0 | 4925 | 0 | 0 | 0 | 0 | 0 | 0 | 0 | 0 |
| pBCH Power Offset | 0 | 0 | 0 | 0 | 0 | 0 | 0 | 1955 | 1955 | 2933 | 2933 | 0 | 0 | 0 |
| pDCCHPower Offset Symbol | 15036 | 29387 | 29387 | 0 | 0 | 0 | 0 | 0 | 0 | 0 | 0 | 0 | 0 | 0 |
| pCFICH Power Offset | 1271 | 0 | 0 | 0 | 0 | 0 | 0 | 0 | 0 | 0 | 0 | 0 | 0 | 0 |
| pHICH Power Offset | 6672 | 0 | 0 | 0 | 0 | 0 | 0 | 0 | 0 | 0 | 0 | 0 | 0 | 0 |
| pbOffset Pdsch | 0 | 0 | 0 | 0 | 15924 | 0 | 0 | 14013 | 0 | 0 | 0 | 15924 | 0 | 0 |
| paOffset Pdsch | 0 | 0 | 0 | 23886 | 0 | 21020 | 21020 | 0 | 21020 | 21020 | 21020 | 0 | 23886 | 23886 |
| Total Configured Power: | 26960 | 29387 | 29387 | 23386 | 19905 | 25945 | 25945 | 19950 | 22975 | 23953 | 23953 | 19905 | 23886 | 23886 |

| Time Period | Maximum Average Power Level | dB Delta |
|---|---|---|
| 5 minutes | 30.0 W | baseline |
| 3 minutes | 33.6 W | .5 dB (above base line) |
| 5 seconds | 37.75 W | 1 dB |
| 1 second | 53.3 W | 2.5 dB |
| 50ms | 59.8 W | 3.0 dB |
| 1ms | 67.1 W | 3.5 dB |
| 275us | 75.3 W | 4.0 dB |
| 67us | 94.8 W | 5.0 dB |
| 1us | 133.9 W | 6.5 dB |
| .1us | 168.6 W | 7.5 dB |

FIG. 5

METHODS AND DEVICES FOR BOOSTING TRANSMISSION POWER OF A SIGNAL IN A WIRELESS COMMUNICATIONS SYSTEM

BACKGROUND

Figure 1A:
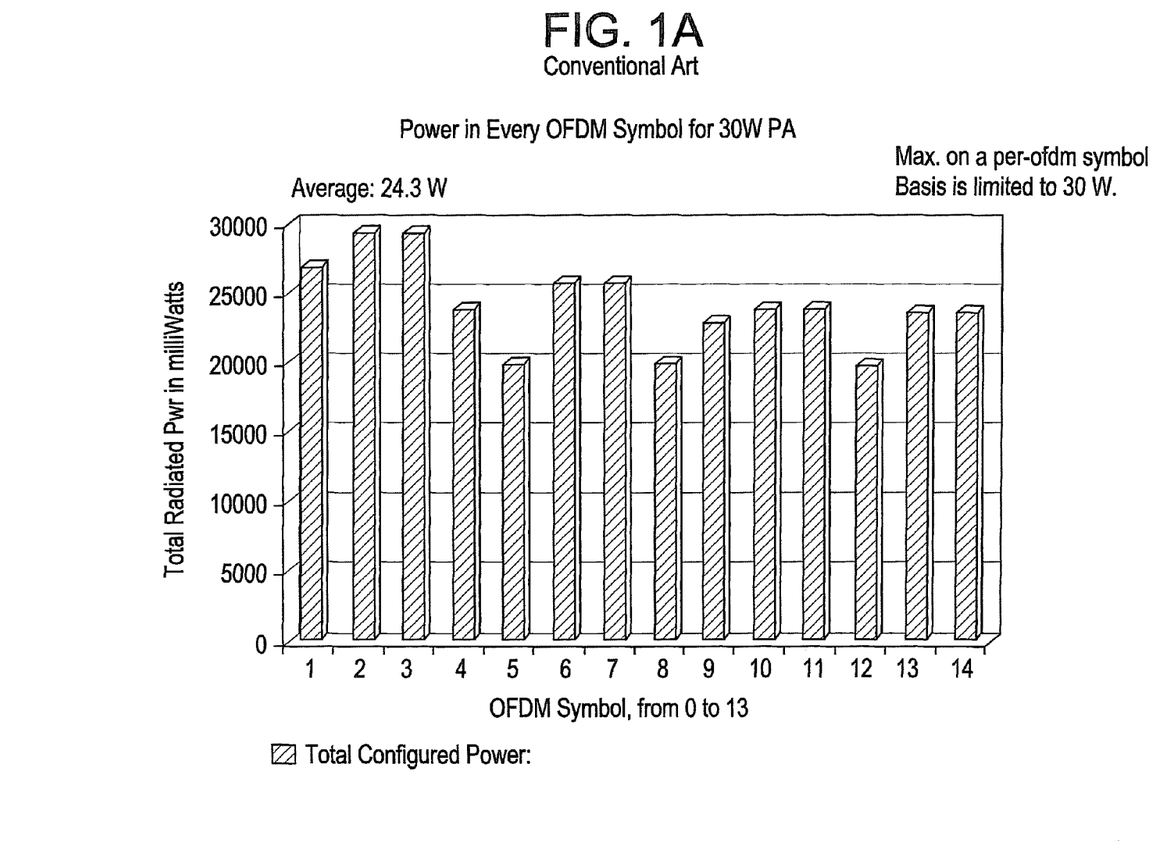
FIGS. 1A and 1B illustrate an example of power assignment to channels in different OFDM symbols for a conventional LTE system.
Figure 1B:
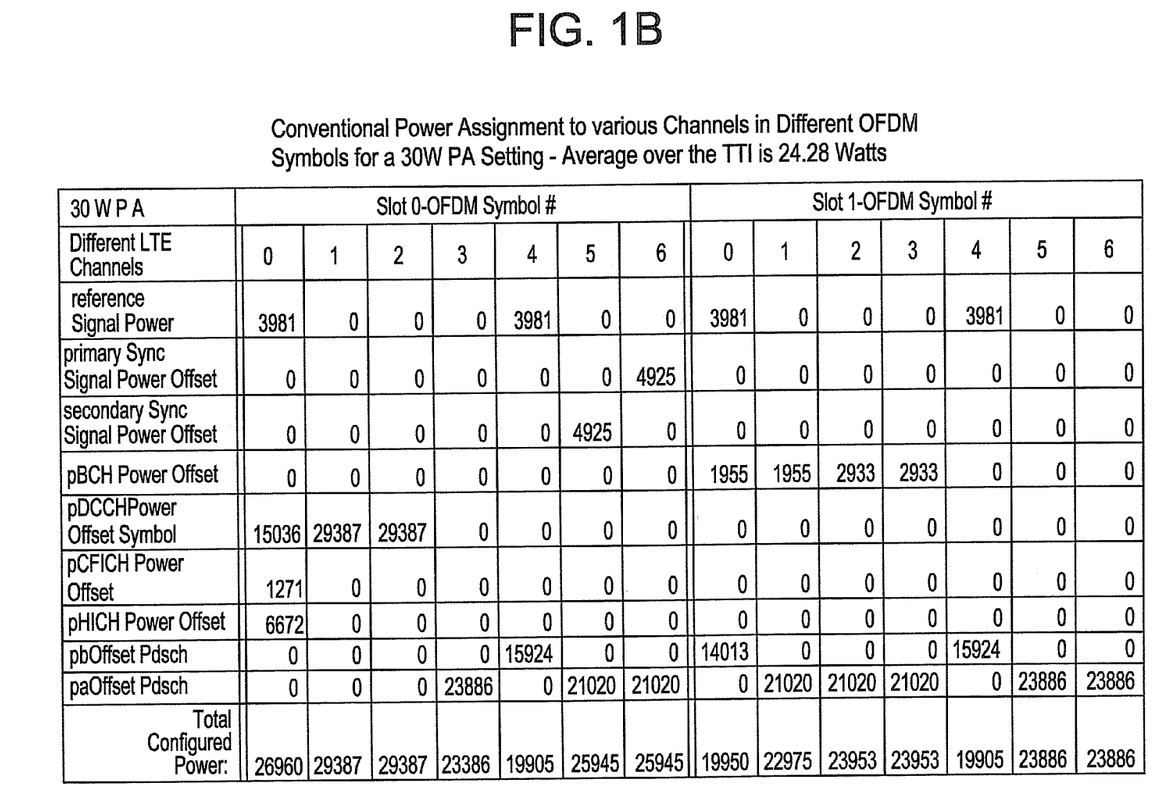

In conventional long-term evolution (LTE) wireless systems, transmission power of a wireless signal is capped in each orthogonal frequency-division multiplexing (OFDM) symbol to the maximum long term average (LTA) power level specified for a transmission time interval (TTI or subframe). FIGS. 1A and 1B illustrate a transmission power per-OFDM symbol over one TTI in a conventional LTE system. In FIGS. 1A and 1B, it is assumed that the power amplifier for providing the transmission power has been set to a limit of 30 W for the TTI. In conventional LTE systems, the transmission power limit for the TTI is the same as a long-term average power limit over many TTIs. Each OFDM symbol in FIG. 1A has a corresponding column in FIG. 1B, which shows the assignment of power to particular channels of the LTE system. Although the power amplifier is capable of producing power above the 30 W limit (e.g., the power amplifier could produce a maximum instantaneous power larger than the 30 W long-term average limit), conventional LTE systems do not allow the total power for each of the OFDM symbols to exceed the 30 W long term average limit. Thus, the average power over each TTI is less than 30 W. For example, as shown in FIGS. 1A and 1B, none of the individual OFDM symbols exceed 30 W, and the average power over one TTI is 24.28 W.

As a result of the above described power scheme, conventional LTE systems are not capable of providing additional transmission power greater than the long-term average limit, even for a time interval as short as one OFDM symbol. Instead of providing additional transmission power, the original transmission power is clipped, a user equipment (UE) is dropped from the system, or several of the UEs are assigned a reduced power to conform to the long-term power limit. This results in reduced performance of the LTE system.

SUMMARY

At least one example embodiment relates to methods and/or devices for boosting power in a wireless communications system (e.g., an LTE system).

According to at least one example embodiment, a method for transmitting a signal in a wireless communications network includes calculating, by a network element, first and second average powers. The first average power is associated with a first time period of a downlink transmission between a transmitter associated with the network element and at least one user, and the second average power is associated with a second time period of the downlink transmission. The method includes transmitting, by the transmitter, the signal at one of a rated transmission power and a boosted transmission power based on a first threshold value associated with the first average power and a second threshold value associated with the second average power. The rated transmission power is less than or equal to a long-term average power limit associated with a power amplifier of the transmitter, and the boosted transmission is greater than the rated power.

According to at least one example embodiment, the transmitting transmits the signal at the boosted transmission power if the calculated first average power is less than the first threshold value and the calculated second average power is less than the second threshold value.

According to at least one example embodiment, the transmitting transmits the signal at the rated transmission power if at least one of (i) the first average power is greater than the first threshold value and (ii) the second average power is greater than the second threshold value.

According to at least one example embodiment, the boosted transmission power is less than or equal to a maximum power level associated with a desired duration of the transmitting.

According to at least one example embodiment, the second time period is greater than the first time period and includes the first time period.

According to at least one example embodiment, the first threshold value is based on a first design parameter value and the rated transmission power, the second threshold value is based on a second design parameter value and the rated transmission power, and the second design parameter value is greater than or equal to the first design parameter value.

According to at least one example embodiment, the transmitting transmits the signal at one of the boosted and rated transmission powers on a per-symbol basis.

According to at least one example embodiment, the signal is one of a control signal and a data signal.

According to at least one example embodiment, the calculating further includes calculating a third average power associated with a third time period of the downlink transmission, and the transmitting transmits the signal at the boosted transmission power if (i) the calculated first average power is less than the first threshold value, (ii) the calculated second average power is less than the second threshold value, and (iii) the calculated third average power is less than the third threshold value.

At least one example embodiment includes a device for carrying out the above described method.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs, eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 2:
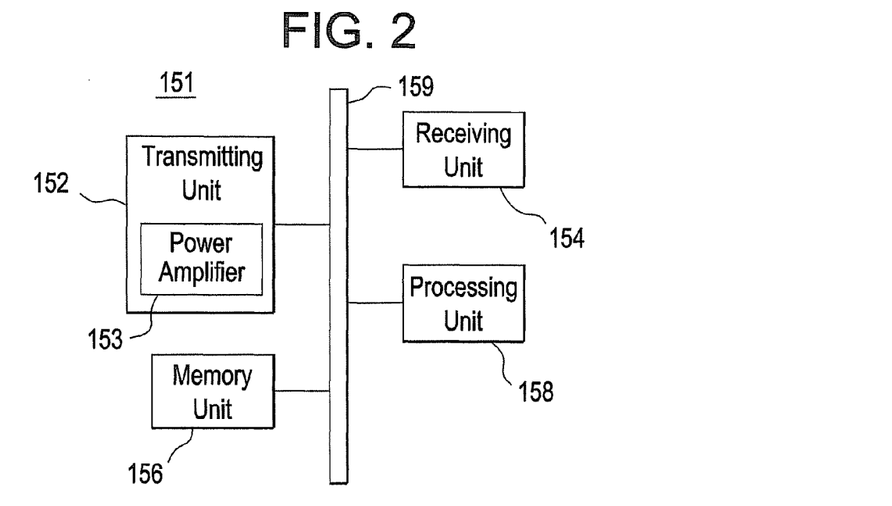
FIG. 2 is a diagram illustrating an example structure of a network element in a wireless communications network according to at least one example embodiment.

FIG. 2 is a diagram illustrating an example structure of a network element according to an example embodiment. According to at least one example embodiment, a network element 151 may be configured for use in a wireless communications network, for example, a long-term evolution (LTE) network. For example, network element 151 may be an eNodeB of an LTE system capable of controlling wireless communication with user equipment (UE). In general, the elements and architecture of LTE systems are well known within the art. Accordingly, detailed discussions of well-known terms, techniques, and structures associated with LTE systems have been omitted from this description. It should also be understood that this description makes apparent to one of ordinary skill in the art how to implement the below described modifications, methods, and devices into existing protocol and existing systems. Although example embodiments are described with respect to a LTE network, it should be understood that example embodiments may also apply to other types of wireless networks such as GSM, UMTS, CDMA, etc.

Referring to FIG. 2, the network element 151 may include, for example, a data bus 159, a transmitting unit 152, a receiving unit 154, a memory unit 156, and a processing unit 158. The transmitting unit 152, receiving unit 154, memory unit 156, and processing unit 158 may send data to and/or receive data from one another using the data bus 159.

The transmitting unit 152 is a device that includes hardware and software for transmitting wireless signals including, for example, data signals, control signals, and signal strength/quality information via one or more wireless connections to other network elements in a communications network. It should be understood that the transmitting unit 152 may have an associated power amplifier 153 for amplifying wireless signals transmitted from the network element 151. Power amplification is discussed in more detail below with respect to FIGS. 3-5.

The receiving unit 154 is a device that includes hardware and software for receiving wireless signals including, for example, data signals, control signals, and signal strength/quality information via one or more wireless connections to other network elements in a communications network.

The memory unit 156 may be any device capable of storing data including magnetic storage, flash storage, etc.

The processing unit 158 may be any device capable of processing data including, for example, a microprocessor configured to carry out specific operations based on input data, or capable of executing instructions included in computer readable code. For example, it should be understood that the modifications and methods described below, with reference to FIGS. 3, 4, and 5, may be stored on the memory unit 156 and implemented by the processing unit 158 within network element 151 from FIG. 2.

Figure 3:
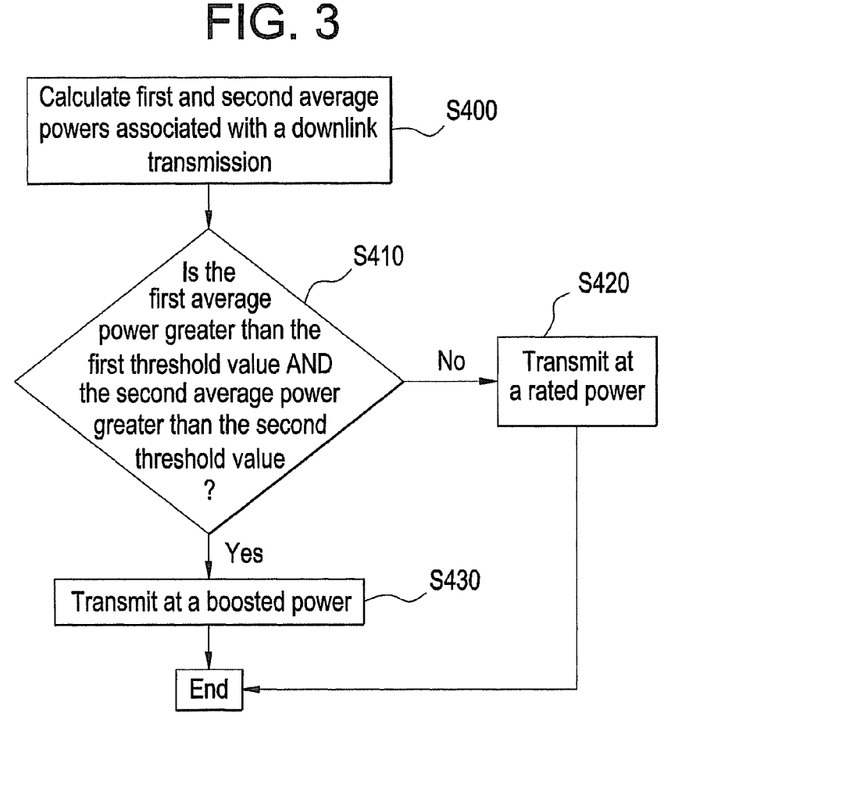
FIG. 3 is a flow diagram illustrating an example operation of the network element of FIG. 2 according to at least one example embodiment.

FIG. 3 is a flow diagram illustrating an example operation of the network element of FIG. 2 according to at least one example embodiment. It should be understood that the network element 151 from FIG. 2 may carry out each of the operations shown in FIG. 3 as a result of computer readable instructions stored on memory unit 156 and executed by the processing unit 158.

In step S400, the network element 151 calculates first and second average powers associated with first and second time periods of a downlink transmission, respectively. According to at least one example embodiment, the second time period is greater than the first time period and includes the first time period. The first and second average powers may be calculated by, for example, an infinite impulse response (IIR) filter, which is well known within the art.

An example algorithm for calculating average powers at 100 ms (i.e., the first time period) and 3 seconds (i.e., the second time period) may be as follows:

100_msec_avg_power_at ($k$)th TTI=
(1−1/$n$)*100_msec_avg_power_at the ($k$−1)th TTI+(1/$n$)*[power used in ($k$)th TTI],where $n$=100;

3-second_avg_power_at ($k$)th TTI=(1−1/$N$)*3-second_avg_power_at the ($k$−1)th TTI+(1/$N$)*[power used in ($k$)th TTI],where $N$=3000.

Steps S410-S430 are steps for deciding when to perform a power boost according to at least one example embodiment.

In step S410, the network element 151 determines whether: (i) the calculated first average power is less than a first threshold value, and (ii) the calculated second average power is less than a second threshold value. If both of conditions (i) and (ii) are not met, the network element 151 transmits at a rated transmission power (or a rated power), as shown in step S420. According to at least one example embodiment, the rated transmission power may be less than or equal to a long-term average power limit of the power amplifier 153 of the transmitter 152.

According to at least one example embodiment, the first threshold value is based on a first design parameter value and the rated transmission power. The second threshold value is based on a second design parameter value and the rated transmission power. These first and second parameter values may be design values determined by empirical study. The second design parameter value may be greater than or equal to the first design parameter value. Accordingly, the second threshold value may be greater than the first threshold value.

If, in step S410, the network element 151 determines that both of conditions (i) and (ii) are satisfied, then the network element 151 transmits the signal at a boosted transmission power (or a boosted power), as shown in step S430. The boosted transmission power may be greater than the rated power, but less than or equal to a maximum power level that the power amplifier 153 is capable of supplying for a desired duration of transmitting at the boosted power. The network element 151 may transmit the signal at the boosted power for a desired duration of one or more OFDM symbols and/or one or more TTIs. It should be understood that the desired duration is less than the time period associated with the long-term average power limit.

A power level of the rated power and/or boosted power may be based on determined transmission conditions between the network element 151 and user equipment (UE). The network element 151 may transmit the signal at the boosted power if desired, for example, if transmission conditions between the network element 151 and a UE are relatively poor. Transmission conditions may take into account a distance between a UE and the network element 151, interference, fading, radio frequency conditions, channel quality indicator feedback from the UE, etc. Methods for determining transmission conditions and methods for determining transmission power levels based on transmission conditions are well known within the art, and thus, have been omitted from this description for the sake of brevity.

An example algorithm for implementing steps S410-S430 may be as follows:

For the kth TTI:

IF [(3-second_avg_power_at the (k−1)th TTI  < a1 * (Rated Transmission Power)) AND (100_msec_avg_power_at the (k−1)th TTI  < a2  * (Rated Transmission Power + 1 dB)],
    THEN perform power boost up to 5 dB for desired channels, if desired
    ELSE do not perform power boost
END.

In the above algorithm, 100 ms may correspond to the first time period, α1*(Rated Transmission Power) may correspond to the first threshold value, 3 seconds may correspond to the second time period, and α2*(Rated Transmission Power+1 dB) may correspond to the second threshold value. It should be understood that α1 and α2 are the first and second design parameter values, respectively. These parameter values are design values determined by empirical study. For example, the first and second design parameter values may range from 0-1.25, in increments of 0.05. Default values for α1 and α2 may be 1.0, which corresponds to a default boost level. A value of 0 may disable the power boost and a value of 1.25 may allow a power boost that is up to, for example, 1 dB more aggressive than the default boost. The "Rated Transmission Power" (or rated power) may be less than or equal to a long-term average power limit (i.e., a maximum power value that an amplifier is capable of transmitting over a relatively long period of time). The power boost may be performed by boosting a transmission power from the rated power to some level above the rated power (i.e., a boosted transmission power or boosted power). According to at least one example embodiment, the network element 151 transmits the signal at one of the boosted and rated transmission powers on a per-symbol basis, as illustrated in FIG. 5 below. Alternatively, the network element may transmit the signal on a per-TTI basis. According to at least one example embodiment, the signal may be one of a common channel (e.g., a reference signal, synchronization channel, etc.), a control signal, and a data signal in an LTE system. The description of FIGS. 4 and 5 discuss an example implementation of the above described method.

Although FIG. 3 describes an example involving two average powers, two time periods, and two threshold values, it should be understood that a method according to an example embodiment may involve any number of average powers, time period, and threshold values. For example, at least one example embodiment may involve one average power, one time period, and one threshold value. In another example embodiment, the method may involve three or more average powers, three or more time periods, and three or more threshold values.

For instance, in step S400, the network element 151 may also calculate a third average power associated with a third time period of the downlink transmission. In step S420, the network element 151 may determine whether: (i) calculated first average power is less than the first threshold value, (ii) the calculated second average power is less than the second threshold value, and (iii) the calculated third average power is less than the third threshold value. If any one of conditions (i), (ii), and (iii) is not satisfied, then the network element 151 transmits at the rated power, as shown in step S420. If all three conditions are satisfied, then the network element 151 may transmit at a boosted power, as shown in step S430.

Figure 4:
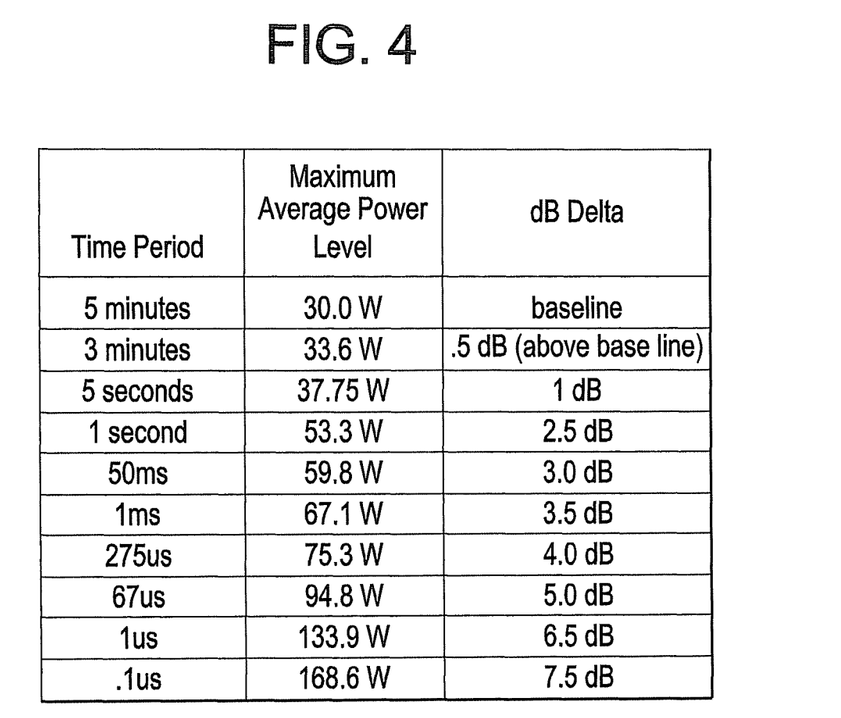
FIG. 4 illustrates an example specification table for a power amplifier of the network element in FIG. 2 according to at least one example embodiment.
Figure 5:
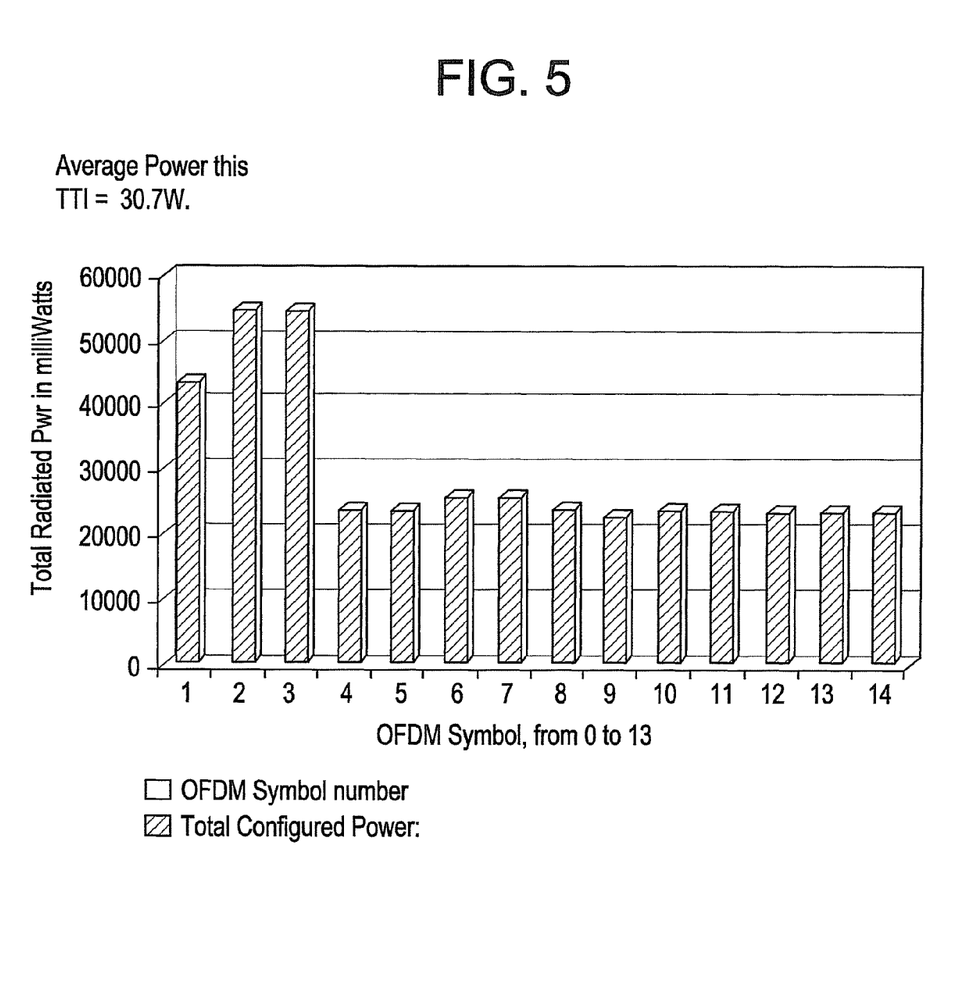
FIG. 5 illustrates an example assignment of transmission power per-OFDM symbol over one TTI according to at least one example embodiment.

FIG. 4 illustrates an example specification table for the power amplifier of the network element shown in FIG. 2 according to at least one example embodiment.

As shown in FIG. 4, a power amplifier according to an example embodiment (e.g., power amplifier 153) is capable of providing different levels of power for different time intervals. For example, over a time period of five minutes, the power amplifier 153 is capable of providing a maximum average power of 30 W (i.e., the long-term average power limit is 30 W). However, over a time period of 1.0 millisecond, the power amplifier 153 is capable of providing a maximum average power of about 67 W, for example.

Still referring to FIG. 4, the specification table includes time periods relevant to the time span of an OFDM symbol and/or the time span of a transmission time interval (TTI) in LTE. For example, a TTI in a LTE system may span about 1 millisecond, and an OFDM symbol in a LTE system may span about 67 microseconds. Thus, according to FIG. 4, the network element 151 may allow the power per-OFDM symbol to be boosted up to about 5 dB above the baseline power level. Similarly, the network element 151 may allow the power per-TTI to be boosted up to about 3.5 dB above the baseline power level. It should be understood that these are example power boosts and example embodiments are not limited thereto. For example, the network element 151 may allow the power per-OFDM symbol and/or the power per-TTI to be boosted to higher or lower levels than the levels described above. In order to mitigate exceeding the power limit of the amplifier for a particular transmission duration, the network element 151 may treat the power amplifier's 153 specifications (e.g., FIG. 4) as an operating parameter.

FIG. 5 illustrates an example assignment of transmission power per-OFDM symbol over one TTI according to at least one example embodiment.

It should be understood that the power levels of FIG. 5 may be produced by a power amplifier having at least one similar specification as the power amplifier used to produce FIG. 4. For example, the power amplifier for FIGS. 4 and 5 may have the same long-term average limit of 30 W over a time period of 5 minutes (the long-term average limit is a limit on the average power over many TTIs). However, a network element operating according to the method of FIG. 4 allows the power limit for a TTI and/or an OFDM symbol to be relaxed such that the average power for the TTI and/or the OFDM symbol may exceed the 30 W long-term average limit.

For example, FIG. 5 shows that the transmission power for first three OFDM symbols may be boosted such that the average total power over the TTI is about 30.7 W, which is greater than the 30 W long-term average limit but less than the 67.1 W power limit associated with the duration of the TTI (i.e., 1.0 millisecond). The boosted transmission power for the first three OFDM symbols may be used to compensate for relatively poor transmission conditions between the transmitter 152 of the network element 151 and a particular UE (e.g., a cell-edge UE), to simultaneously serve multiple UEs, or to operate in canonical format indicator (CFI)=1 and achieve a higher data rate. It should be understood that while the average transmission power for one or more TTIs may exceed the 30 W long-term average limit, the overall average transmission power for all of the TTIs within the 5 minute time period will remain below the long-term average limit of 30 W because only a fraction of the TTIs in the 5 minute time period have receive the power boost. For example, about 5-10% of the TTIs in the 5 minute time period exceed the 30 W long-term average limit while the remaining TTIs have an average power of below 30 W.

As is evident from the preceding description, a network element having the above described modifications and operating according to the above described methods may result in improved throughput for UEs with relatively poor transmission conditions (e.g., cell-edge UEs), improved ability to simultaneously serve multiple UEs, and/or improved data rates for desired UEs, thus improving overall performance of the LTE system.

Variations of the example embodiments are not to be regarded as a departure from the spirit and scope of the example embodiments. All such variations as would be apparent to one skilled in the art are intended to be included within the scope of this disclosure.

What is claimed is:

1. A method for transmitting a signal in a wireless communications network, the method comprising:
   calculating, by a network element, first and second average powers, the first average power being associated with a first time period of a downlink transmission between a transmitter associated with the network element and at least one user, the second average power being associated with a second time period of the downlink transmission; and
   transmitting, by the transmitter, the signal at one of a rated transmission power and a boosted transmission power based on a first threshold value associated with the first average power and a second threshold value associated with the second average power, the rated transmission power being less than or equal to a long-term average power limit associated with a power amplifier of the transmitter, the boosted transmission being greater than the rated power.

2. The method of claim 1, wherein the transmitting transmits the signal at the boosted transmission power if the calculated first average power is less than the first threshold value and the calculated second average power is less than the second threshold value.

3. The method of claim 1, wherein the transmitting transmits the signal at the rated transmission power if at least one of (i) the first average power is greater than the first threshold value and (ii) the second average power is greater than the second threshold value.

4. The method of claim 1, wherein the boosted transmission power is less than or equal to a maximum power level associated with a desired duration of the transmitting.

5. The method of claim 1, wherein the second time period is greater than the first time period and includes the first time period.

6. The method of claim 1, wherein the first threshold value is based on a first design parameter value and the rated transmission power, the second threshold value is based on a second design parameter value and the rated transmission power, and the second design parameter value is greater than or equal to the first design parameter value.

7. The method of claim 1, wherein the transmitting transmits the signal at one of the boosted and rated transmission powers on a per-symbol basis.

8. The method of claim 1, wherein the signal is one of a common signal, a control signal, and a data signal.

9. The method of claim 1, wherein
the calculating further includes calculating a third average power associated with a third time period of the downlink transmission, and
the transmitting transmits the signal at the boosted transmission power if (i) the calculated first average power is less than the first threshold value, (ii) the calculated second average power is less than the second threshold value, and (iii) the calculated third average power is less than the third threshold value.

10. A device for transmitting a signal in a wireless communications network, the device comprising:
a network element configured to,
calculate first and second average powers, the first average power being associated with a first time period of a downlink transmission between a transmitter associated with the network element and at least one user, the second average power being associated with a second time period of the downlink transmission, and
transmit the signal at one of a rated transmission power and a boosted transmission power based on a first threshold value associated with the first average power and a second threshold value associated with the second average power, the rated transmission power being less than or equal to a long-term average power limit associated with a power amplifier of the network element, the boosted transmission being greater than the rated power.

11. The device of claim 10, wherein the network element is configured to transmit the signal at the boosted transmission power if the calculated first average power is less than the first threshold value and the calculated second average power is less than the second threshold value.

12. The device of claim 10, wherein the network element is configured to transmit the signal at the rated transmission power if at least one of (i) the first average power is greater than the first threshold value and (ii) the second average power is greater than the second threshold value.

13. The device of claim 10, wherein the boosted transmission power is less than or equal to a maximum power level associated with a desired duration of the transmitting.

14. The device of claim 10, wherein the second time period is greater than the first time period and includes the first time period.

15. The device of claim 10, wherein the network element is configured to determine the first threshold value based on a first design parameter value and the rated transmission power, and determine the second threshold value based on a second design parameter value and the rated transmission power, the second design parameter value being greater than or equal to the first design parameter value.

16. The device of claim 10, wherein the network element is configured to transmit the signal at one of the boosted and rated transmission powers on a per-symbol basis.

17. The device of claim 10, wherein the signal is one of a common signal, a control signal, and a data signal.

18. The device of claim 10, wherein the network element is configured to,
calculate a third average power associated with a third time period of the downlink transmission, and
transmit the signal at the boosted transmission power if (i) the calculated first average power is less than the first threshold value, the (ii) calculated second average power is less than the second threshold value, and (iii) the calculated third average power is less than the third threshold value.

* * * * *